United States Patent
Blickberndt et al.

(10) Patent No.: US 7,602,897 B2
(45) Date of Patent: Oct. 13, 2009

(54) METHOD FOR SUPPORTING THE MOBILITY OF A SUBSCRIBER ACROSS A COMMUNICATION SYSTEM

(75) Inventors: Dirk Blickberndt, Grevenbroich (DE); Stephan Schaade, Buchloe (DE); Klaus Wille, München (DE)

(73) Assignee: Siemens Aktiengesellschaft, Munich (DE)

( * ) Notice: Subject to any disclaimer, the term of this patent is extended or adjusted under 35 U.S.C. 154(b) by 1153 days.

(21) Appl. No.: 10/515,203

(22) PCT Filed: May 9, 2003

(86) PCT No.: PCT/DE03/01499

§ 371 (c)(1),
(2), (4) Date: Nov. 18, 2004

(87) PCT Pub. No.: WO03/103260

PCT Pub. Date: Dec. 11, 2003

(65) Prior Publication Data

US 2006/0050863 A1 Mar. 9, 2006

(30) Foreign Application Priority Data

May 29, 2002 (DE) ................................. 102 23 979

(51) Int. Cl.
*H04M 3/42* (2006.01)
(52) U.S. Cl. .............. 379/225; 379/211.02; 379/266.09
(58) Field of Classification Search ............ 379/211.02, 379/266.09, 225; 370/352
See application file for complete search history.

(56) References Cited

U.S. PATENT DOCUMENTS

| 5,469,501 | A | * | 11/1995 | Otsuka ................... 379/201.01 |
| 5,729,598 | A | * | 3/1998 | Kay ........................ 379/114.29 |
| 5,764,639 | A | * | 6/1998 | Staples et al. ............... 370/401 |
| 5,905,776 | A | | 5/1999 | Shaffer |
| 6,041,114 | A | * | 3/2000 | Chestnut ................ 379/211.02 |
| 6,229,885 | B1 | * | 5/2001 | Buhrmann et al. ...... 379/216.01 |
| 6,359,892 | B1 | * | 3/2002 | Szlam ........................ 370/401 |
| 6,542,475 | B1 | * | 4/2003 | Bala et al. .................... 370/271 |
| 6,647,104 | B1 | * | 11/2003 | Endo ........................... 379/157 |
| 6,704,411 | B1 | * | 3/2004 | Nishidate ................ 379/265.09 |
| 6,738,362 | B1 | * | 5/2004 | Xu et al. ...................... 370/329 |
| 6,950,507 | B1 | * | 9/2005 | Kaplan .................... 379/142.01 |
| 7,545,806 | B2 | * | 6/2009 | Fiter et al. ................... 370/389 |
| 2003/0174827 | A1 | * | 9/2003 | Henz ...................... 379/220.01 |

FOREIGN PATENT DOCUMENTS

| DE | 199 46 976 A1 | 4/2001 |
| WO | 9738518 A2 | 10/1997 |
| WO | WO 99/23807 | 5/1999 |

* cited by examiner

*Primary Examiner*—Olisa Anwah

(57) ABSTRACT

The invention relates to a method for supporting the mobility of a subscriber across a communication system comprising a communication terminal which is associated with a first communication device and can be registered when a log-on procedure is initiated by the input of log-on information relating to the subscriber, a second communication device for providing configuration data of the subscriber, and a packet-oriented network by which means the communication terminal is connected to the first and second communication devices. Once a successful registration has been carried out, the communication terminal is logged off the first communication device and associated with the second communication device.

20 Claims, 2 Drawing Sheets

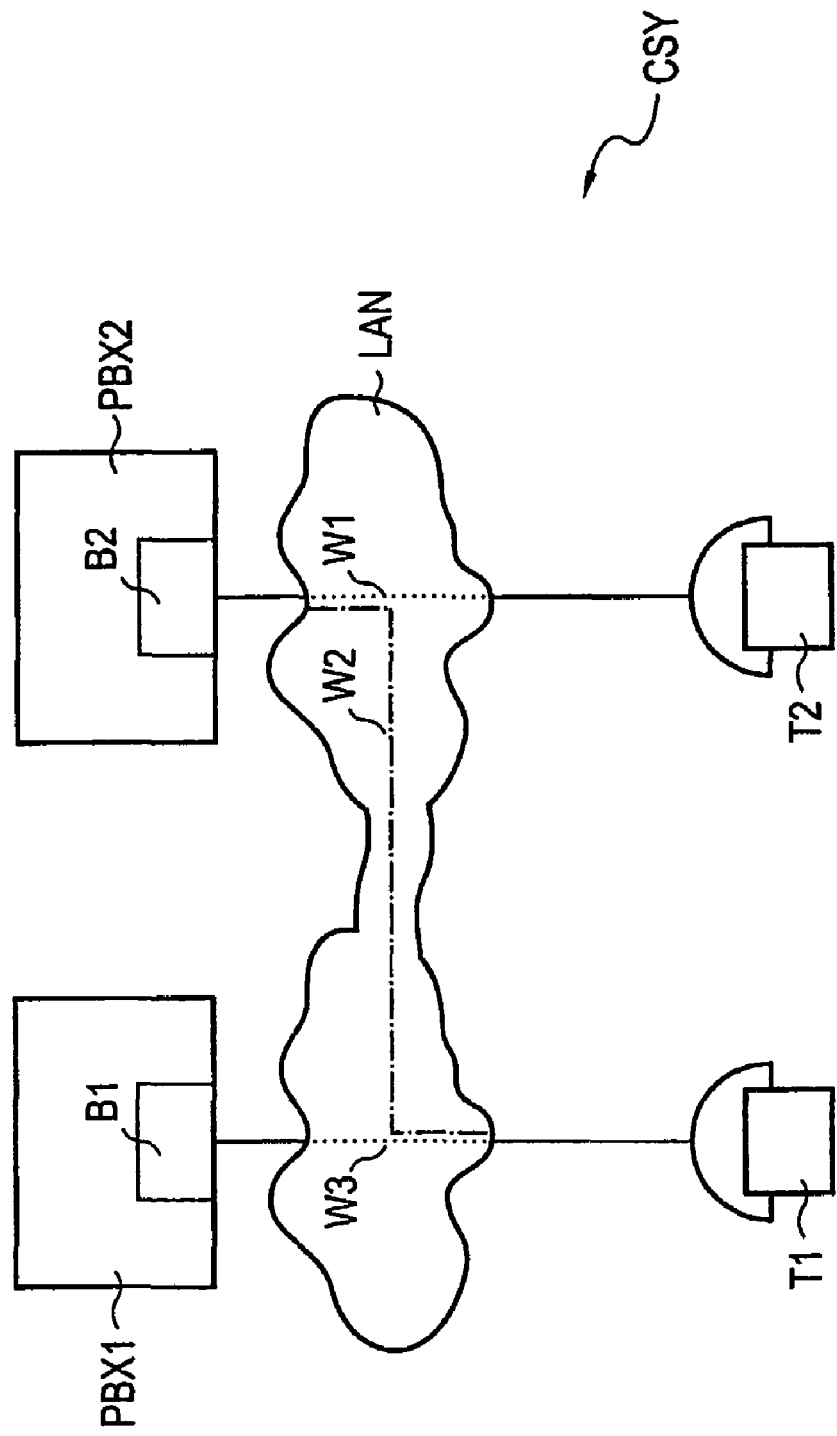

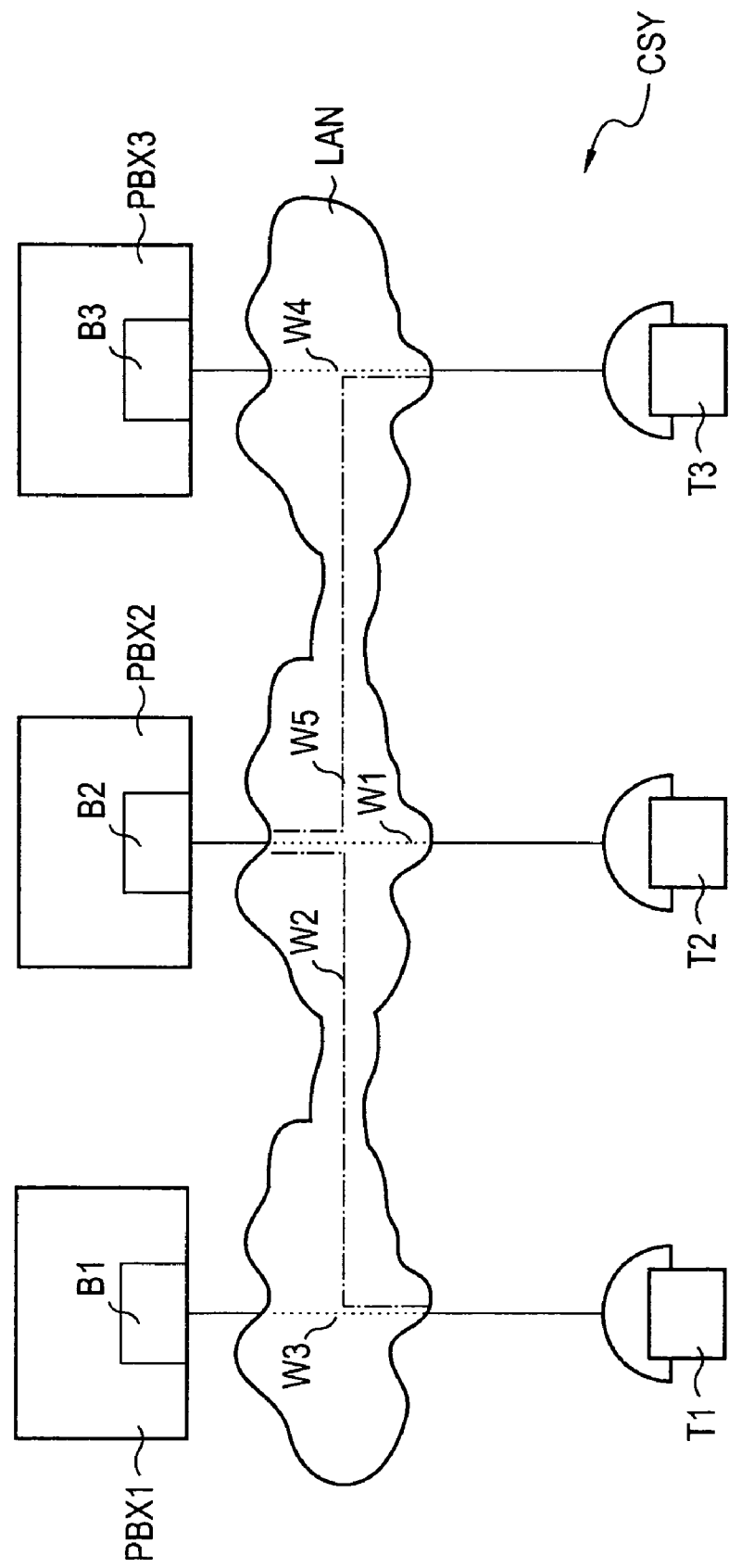

METHOD FOR SUPPORTING THE MOBILITY OF A SUBSCRIBER ACROSS A COMMUNICATION SYSTEM

CROSS REFERENCE TO RELATED APPLICATIONS

This application is the U.S. National Stage of International Application No. PCT/DE03/01499, filed May 9, 2003 and claims the benefit thereof. The International Application claims the benefits of German application No. 10223979.7 filed May 29, 2002, both of the applications are incorporated by reference herein in their entirety.

FIELD OF INVENTION

The invention relates to a method that enables a subscriber within a communication system to switch from one communication terminal assigned to him to another, whilst retaining his or her user-specific configurations.

BACKGROUND OF INVENTION

Modern communication systems enable subscribers, when moving temporarily to a different place of residence, to personalize the "visited" communication terminal at the new place of residence to match their own communication terminal. Such personalization means that the subscriber is able to use his existing user settings, e.g. user-specific feature activations or the settings on his own user interface, at the visited communication terminal, without having to carry out all these settings separately at the new communication terminal.

In order to initiate personalization of this type, the subscriber registers at the visited communication terminal by inputting a user number assigned to him—for example his subscriber number—and a personal identification number (PIN). Registration is also often carried out by means of a chipcard instead of inputting a user number and PIN.

The relevant feature for supporting this temporary or even long-term switch is also known within the circle of experts as "mobile subscriber". The term "mobile subscriber" is also used below to refer to the subscriber using this feature.

Modern communication systems are increasingly moving over to using continuous data streams, e.g. for voice and video communication, and data for controlling communication links via packet-oriented networks. This technology is used, for example, as the basis for so-called Internet telephony, often also known as "Voice over Internet Protocol" (VoIP). As is known, packet-oriented networks include LANs (Local Area Network), MANs (Metropolitan Area Network), WANs (Wide Area Network) or even the Internet, which facilitates worldwide access to data transferred in packets.

In the telecommunications field, communication devices which, as well as conventional communication links based on a circuit-switching principle, also support the VoIP process and connection of suitably configured communication terminals—known as VoIP communication terminals—are becoming increasingly familiar.

In contrast to local communication systems based on so-called peer-to-peer configurations, in which both the communication control and the call-processing control between the communication terminals takes place without a central communication device, the aforementioned communication devices, which have been expanded to include a VoIP functionality, also adopt, in VoIP communication terminals, a central control function with regard to the switching of communication connections.

For this purpose each VoIP communication terminal is registered at its assigned communication device with appropriate subscriber data, such as—for example—the subscriber number, subscriber authorizations, etc. Each VoIP communication terminal is therefore assigned, via the packet-oriented network, to a communication device assigned to it and likewise connected to the packet-oriented network. The packet-oriented network generally incorporates the entire communication system, i.e. the packet-oriented network can be accessed from any point in the communication system. In turn, any potential communication partner may be reached from any possible access point.

The personalization of a visited communication terminal by a mobile subscriber to a communication terminal of his choice is also known in a communication system consisting of a network of multiple communication devices. In a network of this type, a communication device is frequently assigned to a particular subscriber as the so-called home node. At the home node are stored the subscriber's individual configuration data, such as—for example—his subscriber number, authorization information, feature activations, etc.

For example, a method is known from the unexamined German application DE 199 46 976 A1, that permits so-called inter-node user mobility—i.e. the facility to switch from one communication terminal assigned to a first communication device to a visited communication terminal assigned to a second communication device—between communication terminals within a communication system, whilst keeping the individual user settings. When a mobile subscriber logs on to the visited communication terminal, which is assigned to the second communication device, user-specific configuration data is transferred to the second communication device from the first communication device which is assigned to the user as the "home node", whereupon the setting of the user configuration for the mobile subscriber is initiated on the basis of the transmitted configuration data.

Once the user configuration has been set, communication devices—to which communication terminals are assigned via a permanently allocated line and a line unit permanently allocated to the communication terminal in question—take over the call-processing and communication control functions without the interaction of the mobile subscriber's home node. By registering to a communication terminal assigned to a different communication device, the mobile subscriber has apparently "switched" the communication device, whereby no changes occur with regard to his subscriber number and caller identification with outgoing calls.

The above-mentioned method is thus based on the transfer of user-specific configuration data from the communication device that stores this configuration data—the home node—to the communication device assigned to the visited communication terminal. Even though extensive personalization of the visited communication terminal is possible with the help of the user-specific configuration data, in particular—for example—in the form of an allocation of the subscriber's personal authorizations, personal call data recording and call charge assignment, certain group and team functions, such as—for example—a team function technically known as "executive/secretary configuration", are however not possible due to the switching of the communication device from the home node to the communication device assigned to the visited communication terminal. This means that some important functions and features cannot be used by mobile subscribers at other communication devices visited by them.

SUMMARY OF INVENTION

The object of the invention is to provide measures whereby the personalization of a visited communication terminal is guaranteed not only with regard to all user settings and user-specific feature activations, but also with regard to all group and team functions.

The object is achieved by the claims.

According to the invention, the visited communication terminal is initially assigned, via a packet-oriented network, to a first communication device. Once the subscriber has registered at the first visited communication terminal, the visited communication terminal is logged off from the first communication device originally assigned to it and is assigned to a second communication device. This second communication device corresponds to the mobile subscriber's home node. The packet-oriented network thus connects all communication devices arranged in the communication system. Furthermore, all communication terminals—together with the communication device assigned to them in each case—are connected via this packet-oriented network.

A significant advantage of the method according to the invention consists in that a mobile subscriber comes across all functions and feature activations, including all group and team functions, at a visited communication terminal exactly as they appear at the communication terminal assigned to his home node. This happens as a result of the first communication terminal that receives the registration being logged off and the second communication device being assigned to the subscriber's home node. A virtual connection is thus effected via the packet-oriented network across the communication system, as a result of this assignment.

Advantageous developments of the invention are described in the dependent claims.

An exemplary embodiment of the invention is described in greater detail below with the help of the drawing.

BRIEF DESCRIPTION OF THE DRAWINGS

FIG. 1 is a structural diagram schematically illustrating the assignment of a mobile subscriber to a visited communication terminal; and FIG. 2 is a structural diagram schematically illustrating the assignment of the mobile subscriber to a third communication terminal.

DETAILED DESCRIPTION OF INVENTION

FIG. 1 shows a communication system CSY with a packet-oriented network LAN that can be accessed throughout the communication system CSY.

Two communication devices PBX1, PBX2 and two communication terminals are connected to the packet-oriented network LAN. According to this method of connection the two communication terminals T1, T2 support the packet-oriented exchange of user data and/or signaling data, and are therefore configured as VoIP communication terminals T1, T2 (Voice over Internet Protocol), for example.

Each of the two communication devices PBX1, PBX2 contains a line unit B1, B2. The line units B1, B2 each manage so-called home connections (not illustrated), which are each assigned, to a communication terminal T1, T2 by way of administrative measures. The home connection corresponds to a logical connection—also technically known as a "port"—which exchanges communication information with a communication terminal currently assigned to the subscriber. Furthermore, communication information is exchanged, through the relevant home connection, with higher protocol levels and/or control devices of the assigned communication device PBX1, PBX2.

Each home connection is allocated a unique identification number in the packet-oriented network LAN. This identification number is—for example—in the form of an IP address (Internet Protocol). Accordingly, all communication terminals T1, T2 in the communication system CSY are also each allocated an individual IP address, by which they are guaranteed to be uniquely identifiable in the communication system CSY.

In the further description of the exemplary embodiment, the term "assigned communication device" is mainly used to refer in general to a communication device PBX1, PBX2 which is assigned to a corresponding communication terminal T1, T2. In more precise terms, each home connection of the corresponding communication device PBX1, PBX2 is assigned to the respective communication terminal T1, T2. With regard to the fact that the further illustration takes into account only one communication terminal T1, T2, which is to be assigned to the respective communication device PBX1, PBX2, for reasons of clarity only the term "assigned communication device" shall be used below and details of any assignment to the respective home connection shall only be specified in certain cases.

The second communication terminal T2 is permanently assigned to a subscriber—described below as a mobile subscriber—and therefore exists, for example, in the form of a workstation telephone T2 reserved for the mobile subscriber. This second communication terminal T2 is initially assigned, via the packet-oriented network LAN, to a second communication device PBX2—also described below as the mobile subscriber's home node PBX2. The initial assignment of the second communication terminal T2 to the second communication device PBX2 is represented in the drawing by a route W1, shown as a dotted line.

The first communication terminal T1 is initially assigned to the first communication device PBX1 via the packet-oriented network LAN and is described below as the "visited" communication terminal T1. The mobile subscriber wishes to personalize this visited communication terminal T1 as his own terminal using the method according to the invention.

The initial assignment of the first communication terminal T1 to the first communication device PBX1 is represented in the drawing by a route W3, shown as a dotted line.

In the symbolic representation of the routes W1, W3, and of a route W2 that is shown in the drawing by a hatched line but has not yet been explained, it should be remembered that these routes W1, W2, W3 are to be regarded as an illustrative representation of potential "virtual" routes W1, W2, W3, in a packet-oriented network LAN, which—from the technical perspective—is connectionless. If appropriate, the routes W1, W2, W3 are also referred to using the more abstract term "assignment" W1, W2, W3.

For the purpose of personalizing the visited communication terminal T1, the mobile subscriber initiates a log-on procedure in which he inputs log-on information at the visited communication terminal T1. To initiate this log-on procedure, the mobile subscriber inputs a code, for example, or activates a function key, at the visited communication terminal T1. Inputting of log-on information is required for the log-on procedure. Such information might include, for example, the subscriber number and a personal identification number (PIN) of the mobile subscriber. Alternatively, the mobile subscriber uses a chipcard assigned to him for identification and/or authentication at the visited communication terminal T1. The log-on information is exchanged between the visited communication terminal T1 and the communication device PBX1 initially assigned to this communication terminal, via the packet-oriented network LAN.

In an alternative embodiment, the communication terminals T1, T2 in particular can also be implemented as an application on a corresponding computer system (not illustrated). A technical implementation of the communication terminals T1, T2 on computer systems, e.g. workstation computers, is effected—for example—by implementing the application CSTA (Computer Supported Telecommunications Application) according to the standards of the ECMA (European Computer Manufacturers Association). The aforementioned log-on procedure at the visited communication terminal T1 is unnecessary in this case, since most computer systems require the user to log on anyway at a master computer (not illustrated).

The communication device PBX1 initially assigned to the visited communication terminal T1 communicates this log-on information via the packet-oriented network LAN to the mobile subscriber's home node PBX2. Information may also be exchanged via so-called tie lines connecting the two communication devices PBX1, PBX2, instead of via the packet-oriented network LAN. Such tie lines may be implemented—for example—by means of permanent data and/or communication lines between the communication devices PBX1, PBX2 for the exchange of communication and/or control data.

Following completion of the log-on procedure, or even during said log-on procedure, the first communication device PBX1 transmits a log-off request in combination with the log-on information to the mobile subscriber's home node PBX2. The home node PBX2 checks the log-on information, in particular the PIN of the mobile subscriber.

A further optional component of this log-on information communicated to the home node is the IP address of the visited communication terminal T1. If the result of the check on the log-on information is positive, the home node PBX2 returns details of the IP address of the mobile subscriber's home connection to the first communication device PBX1. If necessary, a password is also communicated with the IP address of the home connection, as said password might be necessary for setting up the "mobile subscriber" feature.

The first communication device-PBX1 then forwards the IP address of the home connection ("visiting address"), and—if necessary—the allocated password, to the visited communication terminal T1. The visited communication terminal T1 stores this visiting address together with the IP address ("home address") of the home connection of the communication device PBX2 originally assigned to the visited communication terminal T1.

The assignment W3 of the first communication device PBX1 to the visited communication terminal T1 is then deactivated. This deactivation is requested either by the visited communication terminal T1, or, in an alternative embodiment, by the first communication device PBX1 itself.

In a subsequent procedural step the visited communication terminal T1 transmits a log-on request to the mobile subscriber's home node PBX2. The home node PBX2, on receiving the log-on request, initially transmits a log-off request to the communication device T2 hitherto assigned to it via the route W1 and acknowledges the log-on request from the visited communication terminal T1 following a log-off by the communication terminal T2, with a log-on acknowledgment.

The visited communication terminal T1 is now registered to the mobile subscriber and assigned to the mobile subscriber's home node PBX2 via the route W2. As a result of this assignment W2, all functions and feature activations—including all group and team functions—are identical to those of the communication terminal T2 originally assigned to the subscriber and now logged off. The assignment W3 of the visited communication terminal T1 appears to have been switched over from the first communication device PBX1 to an assignment W2 at the mobile subscriber's home node PBX2. This "switching over" is effected on the basis of the IP address (the visiting address) of the visited communication terminal T1, at which the mobile subscriber has authenticated himself. The mobile subscriber's home node PBX2 stores this visiting address together with the basic address of the communication terminal T2 originally assigned to the mobile subscriber.

The communication terminal T2, which is now logged off—i.e. is no longer assigned to the home node PBX2—periodically transmits a log-on request to the home node PBX2. This log-on request is ignored by the home node PBX2 until the mobile subscriber has logged off again from the visited communication terminal T1, or until the visited communication terminal T1 is logged off due to other changes in circumstances. Such changes in circumstances might arise—for example—following administrative measures or as a result of predefined time limits for the usage duration of the visited communication terminal T1 being exceeded.

When a mobile subscriber logs off or is deactivated at the visited communication terminal T1, the communication terminal T2 originally assigned to the mobile subscriber is automatically reactivated (i.e. reassigned to the mobile subscriber) on receipt of the aforementioned log-on request, which is transmitted to the home node at periodic intervals.

Incoming calls to the basic call number of the visited communication terminal T1—i.e. to the subscriber number assigned to the visited communication terminal T1 before the mobile subscriber logged on—are rerouted, for example to a call destination which is entered in the configuration data of the visited communication terminal T1 as the call diversion destination, if a mobile subscriber is logged on. Such configuration data is stored, for example, in the communication device PBX1 originally assigned to the visited communication terminal.

In an alternative embodiment, it is not necessary for the home connection of the mobile subscriber to be connected to a communication terminal T2. The mobile subscriber in this case therefore does not have a "home telephone" permanently assigned to him. For this case, however, a home connection must be connected in the same way in the connection unit B2 of the home node PBX2 and the mobile subscriber must be configured with corresponding subscriber data.

Following a so-called reactivation the mobile subscriber can reactivate the communication terminal T2 originally assigned to him by a log-on process at this communication terminal T2. This reactivation is accompanied, similarly to the procedure described above, by the deactivation of the assignment of the visited communication terminal T1.

Switching of the mobile subscriber to another communication terminal is described in greater detail below with further reference to the functional units shown in FIG. 1.

FIG. 2 shows an expanded embodiment compared to FIG. 1, whereby the individual functional components are not described in detail where this has already been done for similar or identical functional components in FIG. 1.

FIG. 2 shows a further, third communication device PBX3 of the communication system CSY, to which communication device a third communication terminal T3 is originally assigned over the packet-oriented network LAN, via the route W4.

First of all, it is assumed in the following that the mobile subscriber is still registered at the communication terminal T1, and that the first communication terminal T1 is consequently assigned, via the route W2, to the second communication device PBX2—the mobile subscriber's home node.

The mobile subscriber subsequently logs on at the third communication terminal T3. The log-on at the third communication terminal T3 is effected with regard to the log-on procedure analogously to the log-on at the second communication terminal T2 visited previously. The third communication terminal T3 is described below as the "visited" communication terminal T3.

The log-on information inputted by the mobile subscriber using the log-on procedure is exchanged between the visited communication terminal T3 and the communication device PBX3 originally assigned to this communication terminal via the packet-oriented network LAN. As already illustrated analogously for the assignment of the first communication terminal T1, following the log-on procedure a log-off message is sent by the third communication device PBX3 to the mobile subscriber's home node PBX2, which checks the PIN inputted, among other things. If the result of this check is positive, the IP address of the home node PBX1 and any password necessary for setting up the "mobile subscriber" feature are communicated to the third communication device PBX3.

Also analogously to the above procedure, the original assignment of the third communication terminal T3 to the third communication device PBX3, shown in the drawing by a route W4, is deactivated.

The assignment W2 of the first—previously visited—communication terminal T1 to the mobile subscriber's home node PBX2 is thereupon canceled and replaced by the assignment W4 of the communication terminal T3—which is now being visited—to the home node PBX2.

In order to assign the visited communication terminal T3 to the mobile subscriber's home node PBX2, the visited communication terminal T3 transmits a log-on request to this home node PBX2 upon receiving the IP address of the mobile subscriber's home node PBX2. The home node PBX2, on receiving the log-on request from the visited communication terminal T3, first transmits a log-off request to the communication terminal T1 (the previously visited communication terminal) that has hitherto been assigned to it, and acknowledges the log-on request from the visited communication terminal T3 after the communication terminal T1 has logged off, with a log-on acknowledgment.

The method for assigning the visited communication terminal T3 to the home node PBX2 has hitherto been effected largely analogously to the log-on of the previously visited, first communication terminal T1 at the home node PBX2. A procedural step is explained below, whereby the reassignment W3 of the previously visited communication terminal T1 with the communication device PBX1 originally assigned to this communication terminal, is effected. After the previously visited communication terminal T1 has received a log-off request, it transmits a log-on request to the communication device PBX1 originally assigned to it. The originally assigned communication device PBX1 of the first communication terminal T1 corresponds to its home node PBX1, which is also technically known as the home connection or basic connection.

As a result of this log-on request from the previously visited communication terminal T1 to the communication device PBX1 originally assigned to it, this communication terminal T1 is assigned to the communication device PBX1 via the route W3. The previously visited communication terminal T1 is thus reactivated. Once the previously visited communication terminal T1 is reactivated, this communication terminal T1 may be used again by any other mobile subscriber.

The reassignment of the previously visited communication terminal T1 with the first communication device PBX1 is initiated by log-on requests periodically communicated to the first communication device PBX1. These log-on requests are always transmitted to the home node PBX1, PBX2, PBX3, assigned to the respective communication terminal T1, T2, T3, in this case to the first communication device PBX1. Such periodically transmitted log-on requests are ignored by the home node PBX1 assigned to the respective communication terminal T1 until the mobile subscriber has logged off at the relevant communication terminal. When the "mobile subscriber" feature is deactivated at the visited communication terminal, therefore, this communication terminal T1 is automatically reactivated by the periodically transmitted log-on request to its corresponding home node.

A method is described below that enables a mobile subscriber to switch from the visited communication terminal T3 to the communication terminal T2 originally assigned to him, without first having to log off from the visited communication terminal T3. This process is known as "reactivation". To do this the mobile subscriber registered at the visited communication terminal T3 returns to and logs on at the communication terminal T2 originally assigned to him, without initiating the deactivation of the "mobile subscriber" feature. The reassignment W1 of the communication terminal T2 with its home node PBX2, as described in greater detail below, corresponds to a "reactivation" of the communication terminal T2 originally assigned with the mobile subscriber. This reactivation is accompanied by the deactivation of the visited communication terminal T3.

The mobile subscriber does this by following a procedure at his communication terminal T2 that is similar to the log-on procedure described above. The mobile subscriber's home node PBX2 thereupon transmits a log-off request to the hitherto visited communication terminal T3. The visited communication terminal T3 acknowledges this log-off request, whereupon the assignment W5 of the third communication terminal T3 with the mobile subscriber's home node PBX2 is canceled. After this assignment W5 has been canceled—in a way similar to that described above—log-on requests are transmitted at periodic intervals from the communication terminal T3 to its home node PBX3. The first of the log-on requests to arrive at the third communication device PBX3 after the cancellation of the assignment W5 is acknowledged by said third communication device PBX3 with a log-on confirmation sent to the third communication terminal T3, whereupon the latter is reassigned, via the route W4, to the third communication device PBX3. Thus the communication terminal T3 previously visited by the mobile subscriber can be used again by other visiting mobile subscribers as a communication terminal T3.

The mobile subscriber's home node PBX2 initiates, in a corresponding manner, a reactivation at the home node PBX2 assigned to the communication terminal T2, after the arrival of one of the log-on requests transmitted at periodic intervals from the communication terminal T2 since the deactivation of the communication terminal T2.

A further embodiment of the method according to the invention is described below, whereby the visited communication terminal T3 is deactivated by the mobile subscriber. The mobile subscriber does this by initiating a log-off procedure at the visited communication terminal T3. In order to initiate this log-off procedure, the mobile subscriber—for example—inputs a code or activates a function key at the visited communication terminal T3. Inputting of log-off information may optionally be required for this log-off procedure; such information may include—for example—a subscriber number and a personal identification number (PIN) of the mobile subscriber. Alternatively, the mobile subscriber uses a chipcard for identification and/or authentication in a way similar to the log-on procedure. The mobile subscriber's home node PBX2 thereupon transmits a log-off request to the visited communication terminal T3, this request being acknowledged by said visited communication terminal T3. The assignment of the visited communication terminal T3 with the mobile subscriber's home node PBX2 via the route W4 is thereupon canceled. Using the aforementioned method of periodically transmitting a log-on request, a reactivation is initiated, i.e. an assignment W4 of the third communication terminal T3 with the communication device PBX3 originally assigned to it. Thus the communication terminal T3 previously visited by the mobile subscriber can be used again by other visiting mobile subscribers as a communication terminal T3.

A further embodiment of the method according to the invention is described below, whereby the visited communication terminal T3 is deactivated at the mobile subscriber's home node PBX2 by time setting or by administrative measures. By setting time parameters in the mobile subscriber's home node PBX2, it is possible—for example—to define the period for which the mobile subscriber is permitted to be assigned to a visited communication terminal T3. This time setting may be dependent on whether the visited communication terminal. T3 is a so-called "shared-desk" communication terminal T3, i.e. a communication terminal T3 intended for temporary use, or a communication terminal T3 that is permanently assigned to a subscriber.

The mobile subscriber's home node PBX2 does this by transmitting a log-off request to the visited communication terminal T3. The visited communication terminal T3 acknowledges this log-off request and thereupon initiates a reactivation at the communication device PBX3. Thus the previously visited communication terminal T3 can be used again by other visiting subscribers as a shared-desk communication terminal T3.

The invention claimed is:

1. A method for supporting mobility of a subscriber within a communication system, comprising:
   assigning a communication terminal to a first communication device;
   registering the subscriber at the first communication device by inputting user-specific log-on information at the communication terminal as part of a log-on procedure;
   providing a second communication device;
   providing a packet-oriented network to connect the communication terminal to the first and the second communication devices; and
   the communication terminal logging off the first communication device and being assigned to the second communication device when the registration has been completed.

2. The method according to claim 1, wherein the first and second communication devices each contain a connection unit with a plurality of home nodes having a unique identification in the packet-oriented network.

3. The method according to claim 1, wherein the communication terminal has a unique identification in the packet-oriented network.

4. The method according to claim 2, wherein the communication terminal has a unique identification in the packet-oriented network.

5. The method according to claim 2, wherein the communication terminal is uniquely assigned to a home node.

6. The method according to claim 3, wherein the communication terminal is uniquely assigned to a home node of the second communication device.

7. The method according to claim 1, wherein the communication terminal communicates the log-on information to the first communication device.

8. The method according to claim 2, wherein the communication terminal communicates the log-on information to the first communication device.

9. The method according to claim 3, wherein the communication terminal communicates the log-on information to the first communication device.

10. The method according to claim 7, wherein the first communication device communicates the log-on information to the second communication device.

11. The method according to claim 10, wherein an identification identifying a home node of the second communication device is communicated to the communication terminal.

12. A method for supporting mobility of a subscriber within a communication system, comprising:
   assigning a first communication terminal to a first communication device;
   registering the subscriber at the first communication device by inputting user-specific log-on information at the first communication terminal as part of a log-on procedure;
   providing a second communication device;
   providing a packet-oriented network to connect the first communication terminal to the first and the second communication devices;
   the first communication terminal logging off the first communication device and being assigned to the second communication device when the registration has been completed;
   the first communication terminal communicating the log-on information to the first communication device;
   the first communication device communicating the log-on information to the second communication device;
   communicating an identification of a home node of the second communication device to the first communication terminal; and
   cancelling an assignment of the home node to a second communication terminal assigned to the subscriber when the identification of the home node is communicated to the first communication terminal.

13. The method according to claim 12 further comprising the second communication terminal transmitting a log-on request at periodic intervals to the second communication device following the cancellation of the assignment of the home node to the second communication terminal.

14. The method according to claim 13, wherein the log-on request transmitted at periodic intervals by the second communication terminal is ignored by the second communication device as long as the subscriber is logged on at the first communication terminal.

15. The method according to claim 12, wherein the second communication device stores an identification of the first communication terminal and an identification of the second communication terminal.

16. The method according to claim 13, wherein the second communication device stores an identification of the first communication terminal and an identification of the second communication terminal.

17. The method according to claim 14, wherein the second communication device stores an identification of the first communication terminal and an identification of the second communication terminal.

18. The method according to claim 12, wherein the unique identification is in the form of an IP address.

19. The method according to claim 3, wherein the unique identification is in the form of an IP address.

20. A system for supporting mobility of a subscriber within a communication network comprising:

a communication terminal;

a first communication device and a second communication device configured for communicating with the first communication device;

the first communication device configured to be assigned to a communication terminal;

the communication terminal configured to register a subscriber that inputs user specific log-on information at the communication terminal as part of a log-on procedure;

the first communication device configured to transmits at least a portion of the log-on information to the second communication device to assign the communication terminal to the second communication device;

the second communication device configured to check the at least a portion of the log-on information transmitted by the first communication device and permit assignment of the communication terminal to the second communication device if the check of the at least a portion of the log-on information authenticates the subscriber; and the first communication device also configured to log off the communication terminal after the first communication terminal is assigned to the second communication device.

* * * * *